US007051947B2

(12) United States Patent
Hielm

(10) Patent No.: US 7,051,947 B2
(45) Date of Patent: May 30, 2006

(54) HEAT GENERATOR FOR A MOTOR VEHICLE

(75) Inventor: Odd Hielm, Eldsberga (SE)

(73) Assignee: Konstruktions-Bakelit AB, Orkelljunga (SE)

(*) Notice: Subject to any disclaimer, the term of this patent is extended or adjusted under 35 U.S.C. 154(b) by 117 days.

(21) Appl. No.: 10/481,241

(22) PCT Filed: Jun. 19, 2002

(86) PCT No.: PCT/SE02/01226

§ 371 (c)(1),
(2), (4) Date: Jun. 24, 2004

(87) PCT Pub. No.: WO02/104075

PCT Pub. Date: Dec. 27, 2002

(65) Prior Publication Data

US 2004/0232250 A1 Nov. 25, 2004

(30) Foreign Application Priority Data

Jun. 20, 2001 (SE) .................................... 0102189

(51) Int. Cl.
*B60H 1/02* (2006.01)

(52) U.S. Cl. ........................... 237/12.3 B; 237/12.3 R; 165/41; 165/42

(58) Field of Classification Search ........... 237/12.3 B, 237/12.3 R; 165/41, 42; 123/142.5 E, 142.5 R
See application file for complete search history.

(56) References Cited

U.S. PATENT DOCUMENTS

| | | | | |
|---|---|---|---|---|
| 3,731,729 | A * | 5/1973 | Beatenbough et al. | 165/204 |
| 4,106,472 | A * | 8/1978 | Rusk | 123/205 |
| 4,484,049 | A * | 11/1984 | Ahner et al. | 219/631 |
| 4,493,293 | A * | 1/1985 | Paul et al. | 123/41.12 |
| 5,743,467 | A * | 4/1998 | Ban et al. | 237/12.3 R |
| 5,914,065 | A * | 6/1999 | Alavi | 219/631 |
| 5,979,163 | A * | 11/1999 | Hanners et al. | 60/571 |
| 6,039,007 | A * | 3/2000 | Ban et al. | 122/26 |
| 6,297,484 | B1 * | 10/2001 | Usui et al. | 219/631 |
| 6,900,561 | B1 * | 5/2005 | Vlemmings et al. | 310/59 |

FOREIGN PATENT DOCUMENTS

| | | |
|---|---|---|
| WO | WO 99/45748 A1 | 9/1999 |
| WO | WO 00/78569 A2 | 12/2000 |

* cited by examiner

*Primary Examiner*—Derek S. Boles
(74) *Attorney, Agent, or Firm*—Birch, Stewart, Kolasch & Birch, LLP

(57) ABSTRACT

A heat generator for a motor vehicle comprises a rotor (1), a stator (13) in which the rotor (1) induces by rotation electrical currents that generate heat in the stator (13), and a coolant duct (16) adjacent to the stator (13) through which flows a liquid for extracting the heat generated in the stator (13). A device for regulating the working temperature of a liquid-cooled internal combustion engine comprises such a heat generator and an actuator (19) for the stator (13) for regulating the heat generated by the stator (13) by changing the distance between the stator (13) and the rotor (1). The stator (13) is mounted to be pivotal relative to the rotor (1) for changing the distance between them and thus for regulating the heat generated in the stator (13) and regulating the working temperature of the internal combustion engine (3).

15 Claims, 3 Drawing Sheets

HEAT GENERATOR FOR A MOTOR VEHICLE

The present invention relates in general to a heat generator for motor vehicles, which comprises a rotor, a stator in which the rotor induces by rotation electrical currents that generate heat in the stator, and a coolant duct adjacent to the stator through which flows a liquid for extracting the heat generated in the stator.

The invention also relates to a device for regulating the working temperature of a liquid-cooled internal combustion engine and a method for regulating the heat output produced by such a heat generator.

A heat generator of this type is described in SE-A 9800630-7. It provides very efficient heating of the coolant, which can be used for various heating purposes, for example for heating the coolant in an internal combustion engine in an initial stage after the internal combustion engine has been started.

As a result of the highly-efficient conversion from mechanical power, which drives the heat generator, to generated heat in the coolant, in several applications there can be a requirement to be able to regulate the generated heat output according to a varying need. This could, of course, be carried out by a corresponding variation in the applied mechanical power which drives the heat generator, in the form of a change in the number of revolutions of the rotor of the heat generator. Such a variation in the number of revolutions is, however, not possible in all applications, as other needs can be decisive for the size of the mechanical power, for example the necessary power for propulsion of a vehicle. In such a case, the required heat output can still be achieved by the heat generator being connected intermittently in such a way that the average of the generated heat output equals the required heat output. This intermittent connecting of the heat generator requires, however, a connection device, which can mean that the heat generator becomes complicated and/or undesirably expensive.

In a heat generator according to SE-A-9902321-0, the rotor and the stator are movable in relation to each other for changing the distance between them and thereby changing the heat output generated in the stator. This utilises the fact that a change in the distance between the rotor and the stator affects the size of the currents that the rotor induces in the stator and thereby also the amount of heat generated by these currents. According to SE-A-9902321-0, the means for changing the distance are arranged to change the size of an axial gap between the rotor and the stator.

In a preferred embodiment, the means for changing the size comprise actuators which detect the temperature in the coolant duct. The actuators can be arranged in such a way that when the temperature detected by the actuators reaches a predetermined value, they increase the distance between the rotor and stator essentially instantaneously to a value at which the heat generated in the stator is negligible. As a result, heating of the fluid flowing through the coolant duct in excess of a predetermined temperature can be prevented, for example water as a coolant can be prevented from being heated in excess of 100° C. and can thereby be prevented from evaporating at normal pressure.

Even though the heat generators described above fulfil the requisite requirements concerning capacity and adjustability, there is a need to simplify their construction with the object of achieving high reliability and robust adjustability in the relatively demanding environment created in for example the engine compartment of a motor vehicle.

This need can be met according to the invention by a heat generator of the type described by way of introduction being given the features that are apparent from claim 1. Preferred embodiments of this heat generator are described in the independent claims.

The need is also met by means of a device according to claim 9 and a method according to claim 12.

A heat generator for a motor vehicle of the type described by way of introduction has thus the stator mounted to be pivotal relative to the rotor for changing the distance between them and for regulating the heat generated in the stator. In addition, the stator is suitably mounted to be pivotal on a pivot pin which is located at a distance from the centre of rotation of the rotor and is essentially parallel to a plane that constitutes the plane of rotation of the rotor.

This solution is constructionally simple and robust and is also simple to adjust. In addition, it saves space and it is possible to locate it in the engine compartment of most motor vehicles without the engine compartment needing to be altered.

In the preferred embodiment, the coolant duct is also pivotable together with the stator. Since the change in distance between the rotor and the stator closest to the stator's pivot pin is relatively small, a part of the stator and thus the coolant duct close to this pivot pin will contribute only slightly to the change in the heat development in the stator when this is pivoted. The stator can be in the form of a complete ring, but, on account of the fact described above, the stator and also the coolant duct are preferably in the form of a broken ring with two ends that are at a distance from the pivot pin and are intended to be connected to a cooling loop in the engine of the motor vehicle.

In order to change the pivoted position of the stator, an actuator can be utilised, this being arranged to engage with the stator at a distance from the pivot pin of this.

The device according to the invention for regulating the working temperature of a liquid-cooled internal combustion engine comprises the heat generator and an actuator for the stator for regulating the heat generated by the stator by changing the distance between the stator and the rotor, and is characterised in that the stator is mounted to be pivotal relative to the rotor for changing the distance between them and thereby for regulating the heat generated in the stator and for regulating the working temperature of the internal combustion engine.

A method of regulating the heat given off from a heat generator as above for a motor vehicle is characterised according to the invention in that the stator is mounted to be pivotal relative to the rotor for changing the distance between them and thus for regulating the heat generated in the stator.

An embodiment of the device for regulating the working temperature of a liquid-cooled internal combustion engine, which device comprises a heat generator according to the invention, will be described in more detail in the following with reference to the accompanying drawings.

Figure 1:
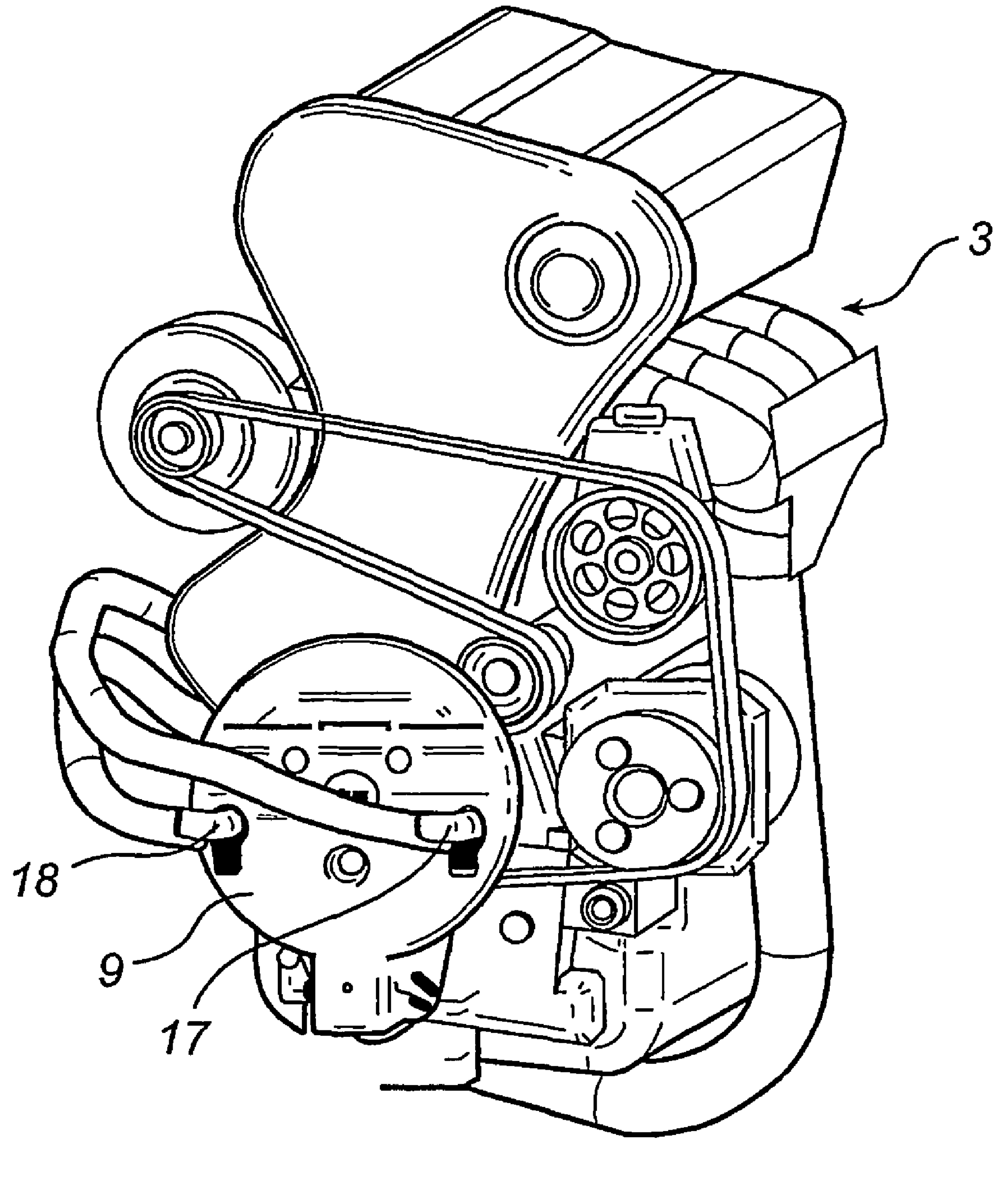
FIG. 1 is a perspective view and shows a possible location of an embodiment of a heat generator according to the present invention on an internal combustion engine.
Figure 2:
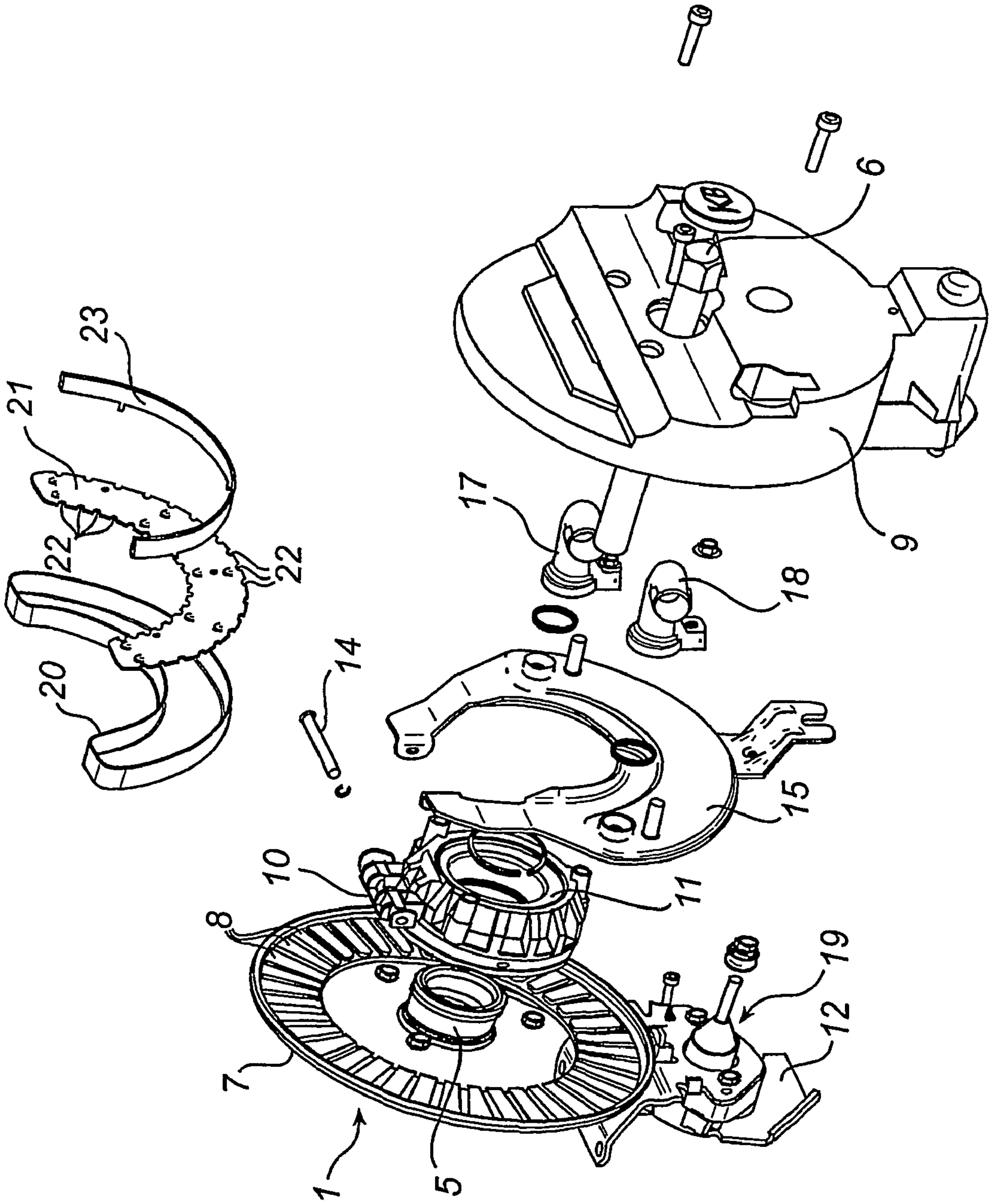
FIG. 2 is an exploded view and shows in perspective parts of an embodiment of a heat generator according to the present invention.
Figure 3:
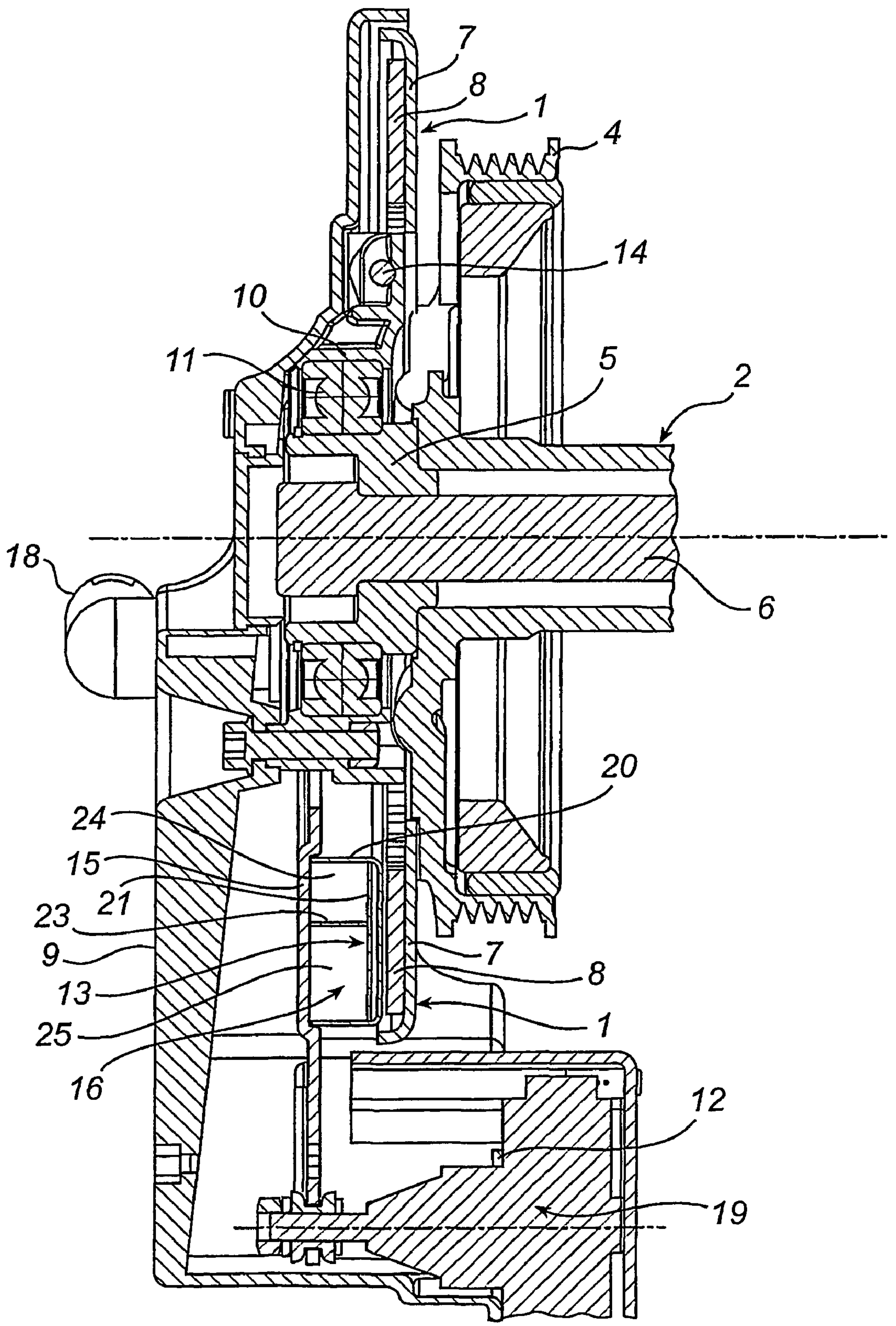
FIG. 3 is a longitudinal section of the embodiment of a heat generator according to the present invention shown in FIG. 2.

The embodiment of a heat generator according to the present invention shown in FIGS. 1–3 comprises a rotor 1, which is fixedly mounted on a driving shaft 2, which can constitute the crankshaft on an internal combustion engine 3, or an extension of this. On the same shaft 2, a pulley 4 can be fixedly attached in a conventional way. The rotor 1 comprises more specifically a hub 5, which is attached to the shaft 2 by means of a bolt 6. The hub 5 supports a ring-shaped rotor plate 7, on the side of which that faces away from the engine 3 a plurality of permanent magnets 8 is attached. The permanent magnets 8 are arranged with axially directed poles and with the polarity alternating from magnet to magnet around the circumference of the rotor 1.

The connection between the hub 5 and the rotor plate 7 is not shown in FIG. 2. Alternatively, and as shown in FIG. 3, the rotor plate 7 can be attached to the hub 5 by being fixedly mounted on the pulley 4.

A stator cover 9 is fixedly connected to a stator holder 10, which in turn is mounted on the hub 5 via a bearing 11. The stator cover 9 and thus the stator holder 10 are prevented from rotating or turning around the hub 5 by the stator cover 9 also being fixedly connected to an arm 12 which in turn is fixed relative to the internal combustion engine 3.

A stator 13 is mounted to be pivotal on a pivot pin 14 supported by the stator holder 10, which pivot pin extends essentially parallel to a plane that constitutes the plane of rotation of the rotor 1. The stator 13 is in the shape of a horseshoe or a broken ring. It comprises a plate 15, a part of which constitutes a delimiting wall for a coolant space 16 which is similarly in the shape of a broken ring. The plate 15 has also connecting pieces 17, 18 to the coolant space 16. At a distance from the pivot pin 14, the plate 15 of the stator 13 is connected to an actuator 19, which in turn is mounted on the arm 12. An axial adjusting movement of the actuator 19 thus results in the stator 13 being pivoted on the pivot pin 14, in such a way that the position of the rotor 1 relative to the stator 13 is changed.

The coolant space 16 is formed by the plate 15 and a trough 20 which describes a circular arc between the connecting pieces 17, 18. These thus constitute the only openings to the otherwise completely closed coolant space 16. The trough 20 or at least its bottom consists of an electrically-conductive, preferably non-magnetic material, such as copper or aluminium. The coolant space 16 contains a partition wall 21 which is arranged at a small distance from the bottom of the trough 20 and has the same extent as this, so that a narrow gap is formed between the partition wall 21 and the bottom of the trough 20. The partition wall 21 has, however, small cut-outs 22 along its long-side edges. In addition, the partition wall consists suitably of a soft magnetic material, for example iron.

The coolant space 16 also contains another partition wall 23, which divides the space between the partition wall 21 and the plate 15 into an inlet duct 24 and an outlet duct 25. The inlet duct 24 extends from the connecting piece 17 and narrows in the direction of the connecting piece 18, with which it is not directly connected. The outlet duct 25 extends alongside the inlet duct 24 and increases in width from the connecting piece 17, with which it is not directly connected, in the direction of the connecting piece 18, into which it opens.

As a result of the design of the coolant space 16 described above, a coolant that is supplied through the connecting piece 17 will flow through the inlet duct 24 and gradually pass through the cut-outs 22 along the long-side edge of the partition wall 21 which is located adjacent to the inlet duct 24. The coolant then flows essentially in a transverse direction through the narrow gap between the partition wall 21 and the bottom of the trough 20 up to and through the cut-outs 22 on the longside edge of the partition wall 24 that is located adjacent to the outlet duct 25. The coolant thereby enters the outlet duct 25 and then flows through this and out through the connecting piece 18.

In the preferred embodiment of the heat generator according to the invention, the coolant space 16 is connected in series with the cooling system of the engine 3 by means of the connecting pieces 17, 18.

The method of operation for the heat generator described above is as follows:

Upon starting up the internal combustion engine 3 in a cold state, the stator 13 is located in a position immediately next to the rotor 1 and more particularly the coolant space 16 in the stator 13 is located immediately next to the permanent magnets 8 on the rotor 1. As a result of this, the permanent magnets 8 generate vortices in the bottom of the trough 20, which results in a strong generation of heat. The generated heat is absorbed by the coolant which flows through the inlet and outlet ducts 24, 25 and thereby increases the engine's working temperature.

As the working temperature of the engine increases as a result of the heating of the coolant in the stator 13, this heating may need to be reduced. This is carried out very simply by the stator being pivoted away from the rotor 1 on the pivot pin 14, whereby the magnetic fields of the permanent magnets 8 generate increasingly smaller vortices in the stator 13. The generated heat output is, of course, also reduced.

The actuator 19 can thus be intended to be connected to a regulating system in the motor vehicle, which regulating system is arranged to control the pivoted position of the stator 13 relative to the rotor 1 dependent upon at least one parameter for a need for the extraction of heat.

The pivoted position of the stator 13 can, in addition, be controlled by control electronics for the combustion engine 3 for limiting the heat output generated in the stator 13 by pivoting the stator 13 to a predetermined position at which the heat generated in the stator 13 is negligible.

The heat generator can, in addition, constitute a mechanically, thermally and electronically integrated part of a system for temperature and emission control of the internal combustion engine 3.

To sum up, the heat generator according to the invention makes possible a rapid heating of both engine and passenger compartment of a motor vehicle. It can be used in a motor vehicle that utilises an internal combustion engine for its propulsion, but the heat generator can, of course, also be used for heating only the passenger compartment of a motor vehicle that uses a different source of propulsion than an internal combustion engine.

The heat generator is highly efficient as, with a suitable permanent magnetic material, it can convert up to 90 kW per kg of magnetic material, although the practical limit is determined by the possible heat transmission to the coolant, which corresponds to a maximal surface output of the order of 100 $W/cm^2$. In a practical embodiment, the heat generator can be designed to produce an adjustable output in the range from zero up to, for example, 15 kW.

The flow space for the coolant, that is the gap between the bottom of the trough 20, that consists preferably of copper, and the partition wall 21, that consists preferably of iron, can be designed in a different way to that described above. As an example, the bottom of the trough 20 and/or the partition wall could be formed with grooves or flanges, that would be able to improve the heat transmission to the coolant.

Other modifications of the embodiments described above are also possible within the scope of invention, as defined in the appended claims.

The invention claimed is:

1. A heat generator for a motor vehicle, which comprises a rotor (1), a stator (13) in which the rotor (1) induces by rotation electrical currents that generate heat in the stator (13), and a coolant duct (16) adjacent to the stator (13) through which flows a liquid for extracting the heat generated in the stator (13), characterised in that the stator (13) is mounted to be pivotal relative to the rotor (1) for changing the distance between them and for regulating the heat generated in the stator (13).

2. The heat generator as claimed in claim 1, in which the stator (13) is mounted to be pivotal on a pivot pin (14) which is essentially parallel to a plane that constitutes the plane of rotation of the rotor (1).

3. The heat generator as claimed in claim 2, in which the pivot pin (14) of the stator (13) is located at a distance from the centre of rotation of the rotor (1).

4. The heat generator as claimed in any one of claims 1–3, in which the coolant duct (16) can pivot together with the stator (13) and is essentially in the shape of a ring.

5. The heat generator as claimed in claim 4, in which the coolant duct (16) is in the form of a broken ring with two ends (17, 18) that are intended to be connected to a cooling loop in the engine (3) of the motor vehicle.

6. The heat generator as claimed in claim 1, comprising an actuator (19) which is arranged to change the pivoted position of the stator (13).

7. The heat generator as claimed in claim 6, in which the actuator (19) is arranged to engage with the stator (13) at a distance from its pivot pin (14).

8. The heat generator as claimed in claim 6 or 7, in which the actuator (19) is intended to be connected to a regulating system in the motor vehicle, which regulating system is arranged to control the pivoted position of the stator (13) relative to the rotor (1) at least dependent upon a parameter for a need for the extraction of heat.

9. A device for regulating the working temperature of a liquid-cooled internal combustion engine, which device comprises a heat generator which is connected to a cooling loop in the internal combustion engine (3) and comprises a rotor (1), a stator (13) in which the rotor (1) induces by rotation electrical currents that generate heat in the stator (13), and a coolant duct (16) adjacent to the stator (13) which is connected to the cooling loop for extracting the heat generated in the stator (13), and an actuator (19) for the stator (13) for regulating the heat generated by the stator (13) by changing the distance between the stator (13) and the rotor (1), characterised in that the stator (13) is mounted to be pivotal relative to the rotor (1) for changing the distance between them and thus for regulating the heat generated in the stator (13) and for regulating the working temperature of the internal combustion engine (3).

10. The device as claimed in claim 9, in which the pivoted position of the stator (13) is controlled by control electronics for the internal combustion engine (3) for limiting the heat generated in the stator (13) by pivoting the stator (13) to a predetermined position at which the heat generated in the stator (13) is negligible.

11. The device as claimed in claim 9 or 10, in which the heat generator constitutes a mechanically, thermally and electronically integrated part of a system for temperature and emission control of the internal combustion engine (3).

12. A method for regulating the heat produced by a heat generator in a motor vehicle (3), which comprises a rotor (1), a stator (13) in which the rotor (1) induces by rotation electrical currents that generate heat in the stator (13), and a coolant duct (16) adjacent to the stator (13) through which flows liquid for extracting the heat generated in the stator (13), characterised in that the stator (13) is mounted to be pivotal relative to the rotor (1) for changing the distance between them and thus for regulating the heat generated in the stator (13).

13. The method as claimed in claim 12, in which the pivoted position of the stator (13) is changed by means of an actuator (19).

14. The method according to claim 12 or 13, in which the pivoted position of the stator (13) relative to the rotor (1) is controlled dependent upon at least one parameter for a need for the extraction of heat.

15. The method as claimed in claim 14, in which the pivoted position of the stator (13) relative to the rotor (1) is controlled dependent also upon other parameters than the parameter for a need for the conduction of heat.

* * * * *